United States Patent [19]

Hockney

[11] Patent Number: 4,951,992

[45] Date of Patent: Aug. 28, 1990

[54] CARGO SUPPORTING FLOOR FOR A MOTOR LORRY

[75] Inventor: Philip K. Hockney, Smithfield, Australia

[73] Assignee: Hockney Pty. Limited, Smithfield, Australia

[21] Appl. No.: 826,550

[22] Filed: Feb. 6, 1986

[51] Int. Cl.$^5$ ............................................. B62D 25/20
[52] U.S. Cl. .................................... 296/204; 296/181; 296/183; 52/588; D25/119; D25/138; 105/422
[58] Field of Search ................. 296/1 F, 29, 181, 183, 296/204; 52/588; 105/422; D25/119, 138

[56] References Cited

U.S. PATENT DOCUMENTS

| | | | |
|---|---|---|---|
| 1,913,342 | 6/1933 | Schaffert | 52/588 |
| 3,269,072 | 8/1966 | Black | 52/588 |
| 3,368,315 | 2/1968 | Thurnau | 52/588 |
| 4,186,537 | 2/1980 | Mountz | 52/483 |
| 4,266,381 | 5/1981 | Deller | 52/177 |

FOREIGN PATENT DOCUMENTS

| | | | |
|---|---|---|---|
| 513845 | 9/1952 | Belgium | 296/183 |
| 1080418 | 4/1960 | Fed. Rep. of Germany | 296/29 |
| 2459335 | 2/1981 | France | 52/588 |
| 86588 | 1/1986 | PCT Int'l Appl. . | |
| 151501 | 9/1955 | Sweden | 296/183 |
| 649309 | 1/1951 | United Kingdom | 296/181 |
| 0739400 | 10/1955 | United Kingdom | 105/422 |
| 835260 | 5/1960 | United Kingdom | 296/181 |
| 2147856 | 5/1985 | United Kingdom | 296/1 F |

*Primary Examiner*—Dennis H. Pedder
*Attorney, Agent, or Firm*—Ladas & Parry

[57] ABSTRACT

A motor lorry cargo supporting floor consists of a plurality of planks which are fixed to at least two supporting beams forming part of the chassis of the motor lorry. The planks are aluminum extrusions fixed to the beams by clips engaging the beams and flanges of supporting portions of the planks, the supporting portions of the planks also engaging the clips to retain the clips in position.

5 Claims, 2 Drawing Sheets

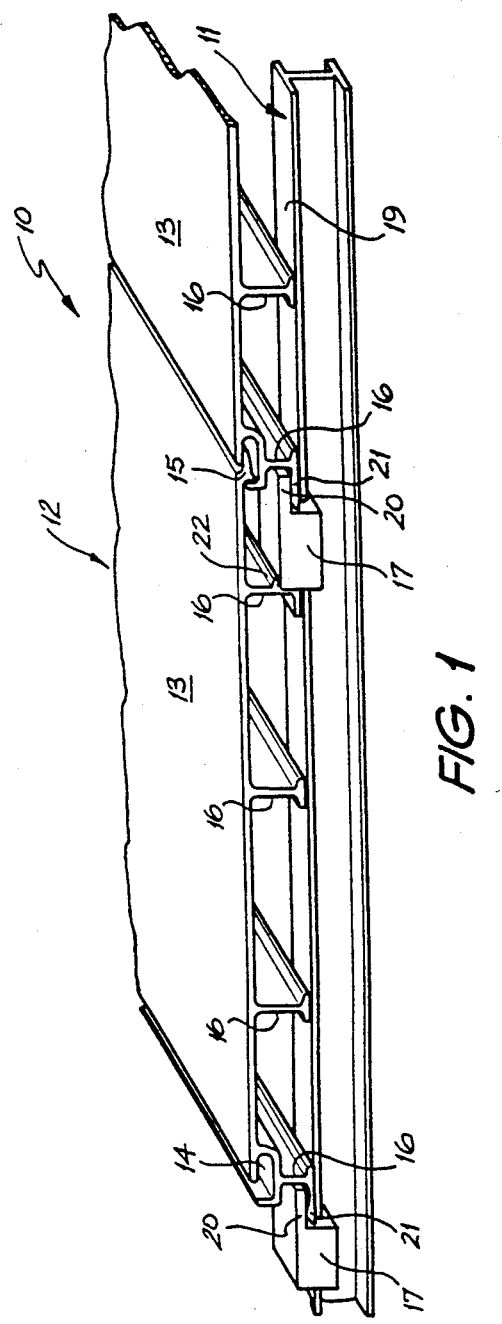
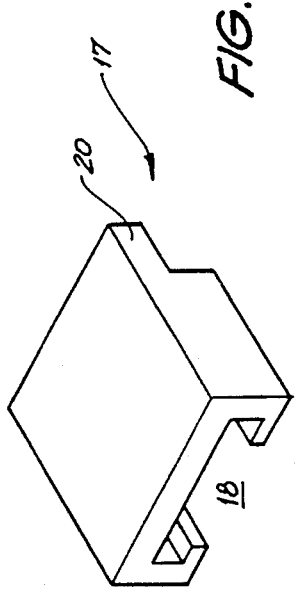

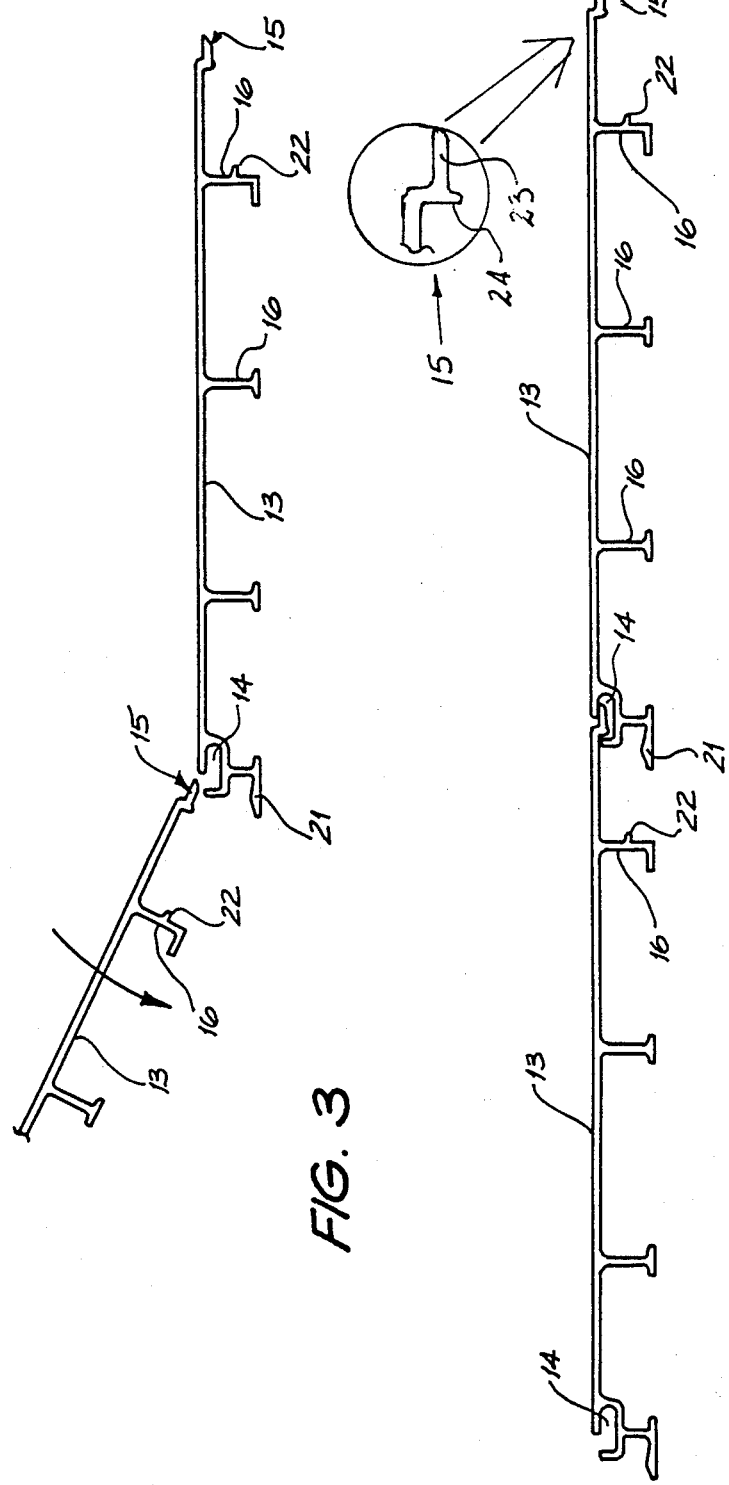

CARGO SUPPORTING FLOOR FOR A MOTOR LORRY

The present invention relates to the construction of cargo supporting floors for motor lorries.

Traditionally in the manufacture of motor lorry cargo floors, either timber or sheet metal has been employed. The use of timber has the disadvantage that it is easily damaged and wears rapidly and therefore provides an uneven surface for the table top. When the floor have been constructed from sheet material, the method of assembly and installation is generally costly. Additionally these sheet metal floors are usually formed of steel and are accordingly heavy.

It is the object of the present invention to overcome or substantially ameliorate the above disadvantages.

There is disclosed herein a cargo-supporting floor assembly for a motor lorry, the motor lorry having a chassis. The floor assembly has at least two beams. The beams are generally parallel and co-extensive. A plurality of generally planar planks extend longitudinally generally transverse of said beams and are abutted so as to provide a generally horizontal load receiving surface. Each plank has longitudinal parallel co-extensive edges, one of said edges having a recess and the other edge having a tongue matingly received within the recess of the next adjacent plank, and each mating recess and tongue co-operating to prevent relative horizontal movement between adjacent planks in a direction normal to said longitudinal edges, each plank further having longitudinal support portions extending generally transverse of said beams and engaging same so that each plank is supported thereby. A plurality of clip means are attached to said beams but movable therealong during assembly of the floor, thereafter to secure the planks to the beams to prevent relative movement of the planks vertically from said beams.

A preferred form of the present invention will now be described by way of example with reference to the accompanying drawings, wherein:

FIG. 1 is a schematic part sectioned perspective view of a portion of the table top of a motor lorry;

FIG. 2 is a schematic perspective view of a clip employed in the construction of the table top of FIG. 1;

FIG. 3 is a schematic side elevation of the planks employed to form the floor of FIG. 1; and FIG. 4 is a schematic side elevation of the planks in position and forming the floor of FIG. 1.

In FIGS. 1 to 4 there is schematically depicted a portion 10 of a table top of a motor lorry, the motor lorry has a chassis including longitudinally extending beams 11 to which a floor assembly 12 is fixed. The floor assembly 12 includes a plurality of planks 13 which extend transverse of the beams 11 with each plank having one longitudinal edge provided with a recess 14 and the other longitudinal edge provided with a tongue 15. The recesses 14 and tongues 15 are shaped so as to co-operate in securing adjacent edges of adjacent planks together. Additionally, each plank 13 is provided with flanged support portions 16 which extend transverse of the beams 11 and rest thereon so as to support the planks 13 on the beams 11. Each plank 13 is provided with a planar upper surface so that the upper surface of the floor so formed is uniform and flat.

The planks 13 are secured to the beams 11 by means of clips 17, of which one is illustrated in FIG. 2. Each clip 17 is provided with a T-shaped recess 18 shaped so as to fit over the top flange 19 of the beam 11 but allow the clip 17 to slide therealong. The clip 17 is also provided with a projection 20 which fits over a bottom flange 21 of one of the support portions 16. The next adjacent support portion 16 abuts the clip 17 and prevents the clip 17 from longitudinal movement along the beam 11. Still further there is provided a projection 22 which also aids in securing the clip 17 in position by engaging the top of the clip.

In assembling the above described floor, when one plank 13 is secured in position by means of the clips 17, the next adjacent plank 13 has its tongue 15 inserted in the appropriate recess 14 and pivoted in position as illustrated in FIG. 3. When inserting the tongue 13, the main projection 23 is inserted in the recess 14, while the plank 13 to be added is inclined to plank 13 which is in position. Thereafter the plank 13 is pivoted, as seen in FIG. 3, until the secondary projection 24 is in position. During this movement, the support portion 16 with its projection 22 engages the clip 17, thereby fixing the clip 17 in position and therefore the associated next adjacent plank 13.

Each clip 17 is inserted in position by sliding it along one of the beams 11.

It is preferred in the construction of the abovedescribed floor, that the planks 13 are formed of extruded aluminium or other suitable material and the clips 17 formed of plastics material.

It should further be appreciated that the beams 11 may also extend transverse of the lorry as opposed to longitudinal of the lorry. The support portion 16 would then extend longitudinally of the lorry.

What I claim is:

1. A cargo supporting floor assembly for a motor lorry, said assembly including at least two beams which are generally parallel and co-extensive, a plurality of generally planar planks which extend longitudinally generally transverse of said beams and are abutted so as to provide a generally horizontal load receiving surface, each plank having longitudinally parallel co-extensive edges, one of said edges being shaped so as to provide a recess and the other edge having a tongue matingly received within the recess of the next adjacent plank so that abutting edges of adjacent planks co-operate to prevent relative horizontal and vertical movement between adjacent planks in directions normal to said longitudinal edges, each plank further having longitudinal support portions extending longitudinally adjacent each said edge and generally transverse of and engaging said beams to that each plank is supported thereby, a plurality of clip means attached to said beams but movable therealong during construction of the floor assembly and engaging the planks to secure the planks to the beams to prevent relative movement of the planks vertically from said beams, each plank having clip engaging means and clip retaining means, with the retaining means spaced from the engaging means, the clips being positioned so as to extend between the clip engaging means of one plank and the clip retaining means of the next adjacent plank, and wherein the clips engage the clip engaging means to prevent vertical movement of the planks away from the beams and the clip retaining means retain the clips in position by preventing clip movement longitudinally of the beams.

2. The floor assembly according to claim 1 wherein each support portion is provided with a flange portion, which flange portions rest on the beams, and said clip engaging means of each plank is provided by one of the flange portions thereof.

3. The floor assembly according to claim 1 wherein said tongue has a generally horizontal extending main projection portion and a downwardly extending secondary projection portion, and said recess engages said main projection portion to prevent vertical relative movement between adjacent planks, and engages said secondary projection portion to prevent horizontal relative movement between adjacent planks.

4. The floor assembly according to claim 1 wherein each beam has an upper flange upon which said planks rest and said clips have a recess within which the beam flange is received so that the clips are movable therealong.

5. The floor assembly according to claim 4 wherein said recess is "T-shaped".

* * * * *